(12) United States Patent
Mueller

(10) Patent No.: US 8,863,592 B2
(45) Date of Patent: Oct. 21, 2014

(54) SENSOR SYSTEM FOR COMBINED SPEED-TORQUE DETECTION

(75) Inventor: Wolfgang-Michael Mueller, Yokohama (JP)

(73) Assignee: Robert Bosch GmbH, Stuttgart (DE)

( * ) Notice: Subject to any disclaimer, the term of this patent is extended or adjusted under 35 U.S.C. 154(b) by 102 days.

(21) Appl. No.: 13/518,728

(22) PCT Filed: Dec. 7, 2010

(86) PCT No.: PCT/EP2010/069018
§ 371 (c)(1),
(2), (4) Date: Aug. 29, 2012

(87) PCT Pub. No.: WO2011/076554
PCT Pub. Date: Jun. 30, 2011

(65) Prior Publication Data
US 2012/0325020 A1      Dec. 27, 2012

(30) Foreign Application Priority Data
Dec. 23, 2009   (DE) .................. 10 2009 055 275

(51) Int. Cl.
*G01L 3/02*     (2006.01)
*G01L 3/10*     (2006.01)

(52) U.S. Cl.
CPC ....................... *G01L 3/109* (2013.01)
USPC .................................... 73/862.193

(58) Field of Classification Search
USPC .................................... 73/862.193
See application file for complete search history.

(56) References Cited

U.S. PATENT DOCUMENTS

| 4,874,053 | A  | * | 10/1989 | Kimura et al. ............. 180/443 |
| 4,926,121 | A  |   | 5/1990  | Guay |
| 5,301,559 | A  | * | 4/1994  | Tsuji et al. ............ 73/862.326 |
| 6,331,772 | B1 | * | 12/2001 | Windte et al. .......... 324/207.24 |
| 6,759,648 | B2 | * | 7/2004  | Baxter et al. ............ 250/231.13 |
| 6,935,193 | B2 | * | 8/2005  | Heisenberg et al. ..... 73/862.324 |
| 2004/0015307 | A1 | * | 1/2004 | Heisenberg ................. 702/72 |

FOREIGN PATENT DOCUMENTS

| DE | 22 31 571 | 1/1974 |
| DE | 38 21 083 | 1/1989 |
| DE | 42 32 040 | 4/1993 |
| EP | 1 295 780 | 3/2003 |
| EP | 1 861 681 | 12/2007 |

\* cited by examiner

*Primary Examiner* — Lisa Caputo
*Assistant Examiner* — Octavia D. Hollington
(74) *Attorney, Agent, or Firm* — Kenyon & Kenyon LLP

(57) ABSTRACT

A sensor system having at least two phase tracks spaced apart in the axial direction of a rotation axis of a rotating body and situated circumferentially around it, having at least one sensor element for each phase track situated fixed in place opposite the rotating body to detect the particular phase track. At least one first sensor element assigned to a first phase track, with at least one second sensor element assigned to the first phase track, is connected to at least one first sensor element bridge, extending parallel to the first phase track and perpendicularly to the rotation axis of the rotating body, and at least one sensor element assigned to a second phase track, with at least one sensor element assigned to the first phase track, is connected to at least one second sensor element bridge extending perpendicularly to the two phase tracks and parallel to the axis.

16 Claims, 3 Drawing Sheets

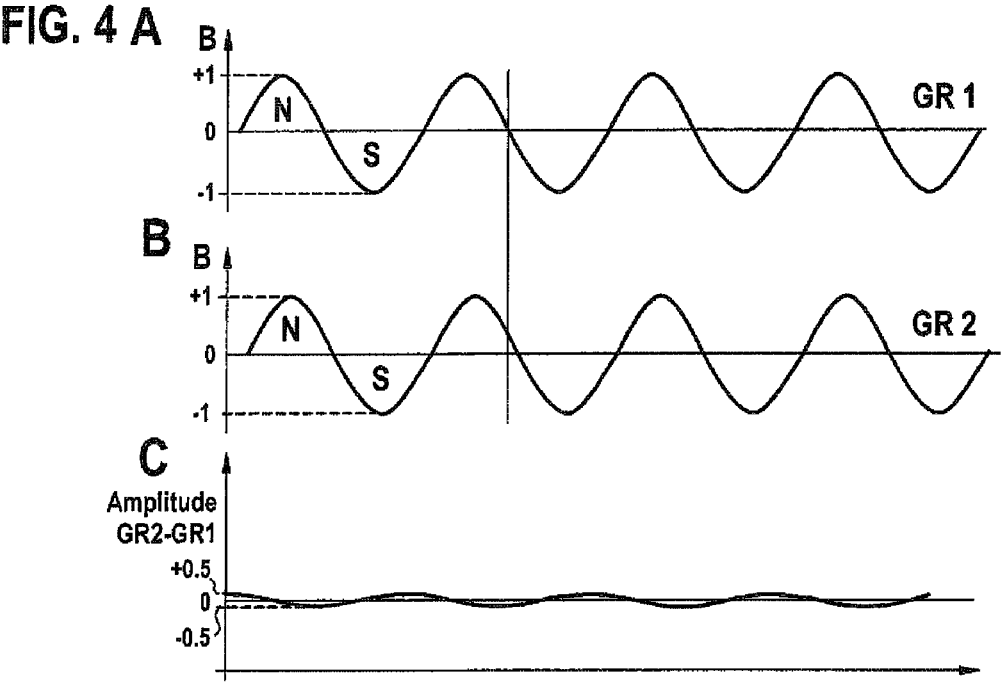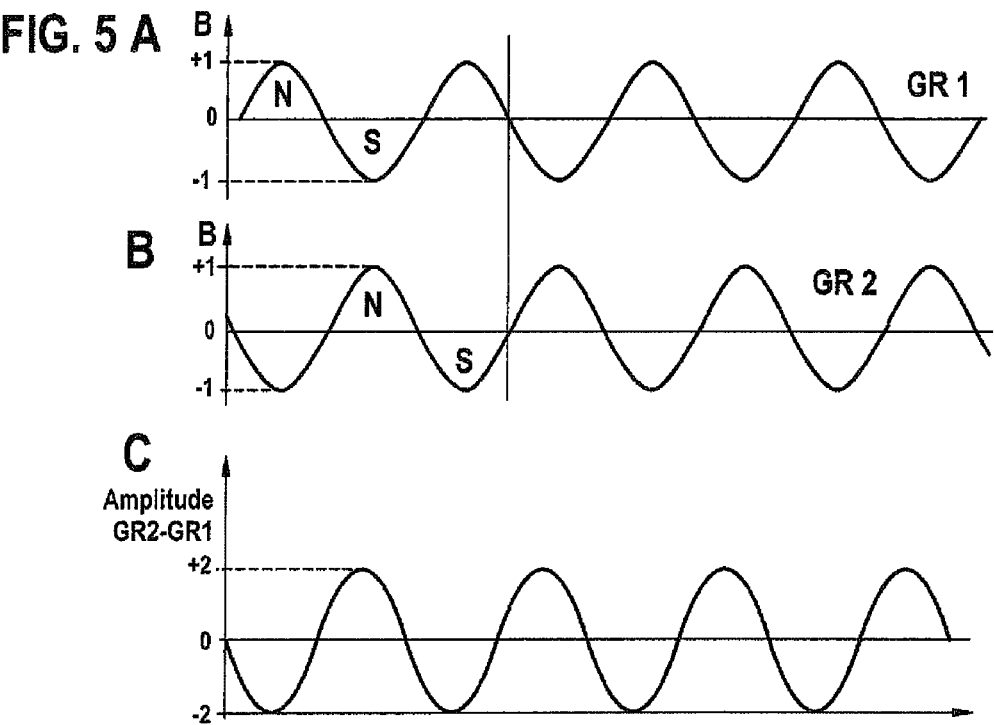

SENSOR SYSTEM FOR COMBINED SPEED-TORQUE DETECTION

FIELD OF THE INVENTION

The present invention relates to a sensor system for the combined detection of speed and torque.

BACKGROUND INFORMATION

To detect a rotational speed of a shaft, or more generally the rotational speed of a rotating body, for example an engine speed, e.g., at a crankshaft, sensor systems are known which have a material measure which is situated circumferentially around the rotating body and is referred to as a phase track, in the form of a sequence of repeating, periodic markings, as well as at least one sensor element which is situated fixed in place opposite the rotating body and which detects the phase track. The sensor element is sensitive to the markings of the phase track and generates a sensor signal, for example when passing a marking and/or when adjacent markings are changed, so that a known number or a known sequence of sensor signals is/are generated over a determined rotation angle, e.g., over one full rotation, a rotational speed being ascertained or inferred from the sensor signals with the aid of an evaluating unit by involving a time signal.

The markings of the phase track may be, for example, optical markings, so that the sensor element may detect, for example, light/dark transitions. Other sensor principles, such as magnetic or capacitive principles, are also possible for the same purpose.

The phase track may be situated directly on the rotating body or on an element which is non-twistably connected thereto, such as a sensor wheel, for example.

Hall elements, for example, may be used as sensor elements, the markings of the phase track having a magnetic configuration, for example as a sequence of alternating magnetic north and south poles. In addition to Hall elements, the use of magnetoresistive elements, for example GMR elements (GMR=giant magnetoresistor) are also known.

In the case of the sensor wheels, so-called multipole sensor wheels are known which are made of a material capable of magnetization. In this regard, the markings of the phase track are magnetized as magnetic north and south poles which are alternatingly situated in the circumferential direction, similarly to the teeth of a toothed wheel, a so-called steel sensor wheel, as described above. Methods are known, for example, for manufacturing and magnetizing a sensor wheel from a homogeneous, ferromagnetic material, e.g., from steel, as well as for using a plastic-bonded, magnetizable material in the manufacture of sensor wheels.

If Hall elements are used as sensor elements, for example, a differential evaluation may take place, the difference between the signals of two Hall elements situated consecutively in the circumferential direction being evaluated. So-called Hall ASICs are also known per se, which are able to evaluate a magnetic field direction. Furthermore, the use of two-channel, differential Hall element configurations in the form of so-called dual differential sensor elements are known, which may be used to detect both the rotational speed and the direction of rotation. These Hall element configurations include a total of three sensor elements, each of two sensor elements being interconnected to form antiparallel-connected sensor element bridges. Both sensor element bridges extend parallel to the direction of rotation of the phase track, which, in a top view, runs perpendicularly to the rotation axis.

Furthermore, for example, EP 1 861 681 B1 refers to circumferentially situating a phase track at least on two cross sections of a rotating body of known torsional stiffness, which are located at a known distance from each other in the axial direction along a rotation axis, for the purpose of determining a torque transmitted between the two cross sections of the rotating body by determining a torsion angle between the two cross sections and inferring the torque present between the two cross sections on the basis thereof, via the torsional stiffness. It is apparent that the torsion angle is the torsion and the torque is the attacking torsional moment.

Also, EP 1 861 681 B1 indicates that when detecting a rotation angle of a rotating body, compensating for a tilting between the sensor track provided by the optimum detection or resolution of the passing of markings on the sensor element and direction of rotation of the phase track which, in a top view, runs perpendicularly to the rotation axis, by using multiple phase tracks which are circumferentially situated parallel to each other, and a matrix-based evaluation of all phase tracks.

SUMMARY OF THE INVENTION

According to the exemplary embodiments and/or exemplary methods of the present invention, a sensor system is provided which has at least two phase tracks which are circumferentially situated on at least two cross sections of a rotating body of a known torsional stiffness which are located a known distance apart in the axial direction along a rotational axis. The sensor system has at least one sensor element for each phase track which is situated fixed in place opposite the rotating body and which detects the particular phase track, the phase track passing the sensor element transversely to the rotation axis when the body rotates. Each sensor element generates a sensor signal when it passes a marking and/or when adjacent markings of the phase track assigned to a sensor element change. At least two sensor elements assigned to a first phase track are connected to at least one first sensor element bridge for the purpose of detecting at least the rotational speed of the rotating body.

This first sensor element bridge extends in a top view largely parallel to the phase track and largely perpendicularly to the rotation axis of the rotating body. Together with at least one sensor element assigned to the first phase track, at least one sensor element assigned to a second phase track is connected to at least one second sensor bridge, which is used to ascertain a torque transmitted between the two cross sections of the rotating body. The latter is possible in that a torsion angle is determined between the two cross sections with the aid of the second sensor bridge, and the torque present between the two cross sections is inferred on the basis thereof via the known torsional stiffness of the rotating body.

For this purpose, the second sensor element bridge extends in a top view transversely to the two phase tracks, for example largely perpendicularly to the two phase tracks and parallel to the rotation axis of the rotating body. The first sensor element bridge thus extends in a top view in the direction of rotation of the parallel running phase tracks, more precisely over the first phase track, while the second sensor bridge extends in a top view transversely to the direction of rotation of the phase tracks, for example at right angles, so that the first and second sensor element bridges form an angle not equal to an integral multiple of 0° and 180°. The first and second sensor element bridges particularly may stand perpendicularly to each other.

The first sensor element bridge provided for detecting the rotational speed and the second sensor element bridge provided for detecting the torque may be evaluated digitally.

Alternatively, an analog evaluation of one or both sensor element bridges is also conceivable.

The rotational speed detection may also be carried out in a dual differential manner, for example by situating two sensor element bridges in parallel, which makes it possible to detect the direction of rotation.

The phase tracks may be situated directly on the rotating body or on elements which are non-twistably connected thereto, such as a sensor wheel, for example. The markings of the phase tracks may be, for example, optical markings, so that the sensor element may detect, for example, light/dark transitions. Other sensor principles, e.g., magnetic or capacitive principles, are also possible. Combinations thereof, which may be detected, for example, using different sensor elements, are also conceivable. Alternatively or additionally, the markings of the phase tracks or of at least one phase track may have a magnetic configuration, for example as a sequence of alternatingly situated magnetic north and south poles, which makes it possible to use Hall elements as sensor elements. This furthermore provides an integrated approach to detecting the rotational speed of a rotating body as well as the torque transmitted thereby, using only a single sensor system which may be accommodated in a shared housing and/or on a single shared chip.

Advantages of the sensor system according to the exemplary embodiments and/or exemplary methods of the present invention over the related art are derived, in particular, by the fact that the combination of a detection of rotational speed and torque with the aid of the two sensor bridges, which are situated, for example, at a right angle to each other, makes it possible to integrate both functions into one housing in a particularly space-saving and economical manner. It is furthermore possible to output both items of information, the information relating to the rotational speed as well as the information relating to the torque, over only one signal line, if an intelligent electrical interface is used, which saves, for example, money, material and time, since only one electrical connection must be established. In addition, the sensor system enables the torque to be used as a control variable, for example when installed in motor vehicles, which makes it possible to omit other previously required sensors. With the aid of the sensor system, for example, the difference between a torque desired by the driver and predefinable, for example, by a pedal position, and an actual torque output by the engine may be used as a control variable by an engine control unit.

According to one advantageous embodiment of the present invention, it is provided that the sensor element assigned to the first phase track, connected to the sensor element assigned to the second phase track to form the second sensor element bridge, is a sensor element of the first sensor element bridge. As a result, no more than three sensor elements which are sensitive to the markings of the phase tracks are needed for the reliable detection of rotational speed and torque, which affords the sensor system a particularly economical and compact configuration. In addition, the sensor system requires only a few connections, for example for connection to an evaluating unit, for example no more than four connections for ground, supply voltage, rotational speed signal and torque signal. A configuration may also be provided in which both items of information relating to the rotational speed and the torque are output over a shared signal line.

The first and second sensor element bridges may be situated in a shared housing for a sensor.

Alternatively or additionally, the first and second sensor element bridges may be situated on a shared chip for a highly compact sensor chip.

At least the first and second phase tracks may be situated on two separate sensor wheels which are connected to the rotating body. It is also conceivable that only one phase track is situated on one sensor wheel, and the other phase track is situated or mounted directly on the rotating body. Multipole sensor wheels, as described above, may be used as sensor wheels.

At least the sensor elements of at least one sensor bridge may be Hall elements, the associated phase track in each case including magnetic markings, for example a sequence of alternatingly situated magnetic north and south poles.

Alternatively or additionally, it is conceivable that at least the sensor elements of at least one sensor bridge are magnetoresistive elements (e.g., GMR; giant magnetoresistor).

A particularly advantageous embodiment of the sensor system according to the present invention includes at least one additional sensor element bridge which is situated parallel to the first sensor element bridge and which includes, for example, a third sensor element assigned to the first phase track and a fourth sensor element also assigned to the first phase track. Alternatively, it is conceivable to produce the additional sensor element bridge by connecting a sensor element of the first sensor element bridge to a third sensor element. Together with the first sensor element bridge, the additional sensor element bridge permits not only the detection of the rotational speed but also the detection of the direction of rotation of the rotating body. The first and the additional sensor element bridges may thus form, for example, a differential sensor element system as described above in the form of so-called dual differential sensor elements.

The exemplary embodiments and/or exemplary methods of the present invention are explained in greater detail below on the basis of exemplary embodiments illustrated in the drawings. In the drawings, the same reference numerals identify the same elements or elements having the same function.

BRIEF DESCRIPTION OF THE DRAWINGS

FIG. 4 shows diagrams including schematically illustrated curves of the signals of the sensor elements of the second sensor element bridge (FIGS. 4a and 4b) as well as the difference between the signals (FIG. 4c) in a nearly torque-free state over an observation period.

FIG. 5 shows diagrams including schematically illustrated curves of the signals of the sensor elements of the second sensor element bridge (FIGS. 5a and 5b) as well as the difference between the signals (FIG. 5c) in a torque-loaded state over an observation period.

DETAILED DESCRIPTION

Figure 1:
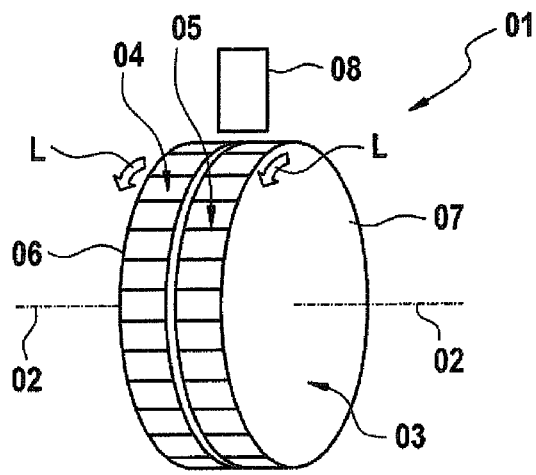
FIG. 1 shows a schematic representation of a sensor system having two phase tracks which are spaced a distance apart in the axial direction of a rotation axis and which are situated circumferentially around a rotating body, in a perspective view.
Figure 2:
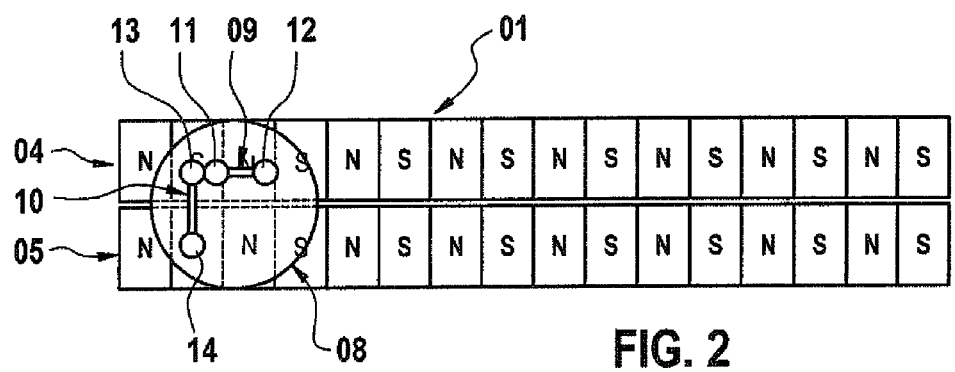
FIG. 2 shows a schematic representation of a developed view of the two phase tracks of the sensor system from FIG. 1 in a torque-free state, including the configuration illustrated schematically therein of a first and a second sensor element bridge, in a top view.
Figure 3:
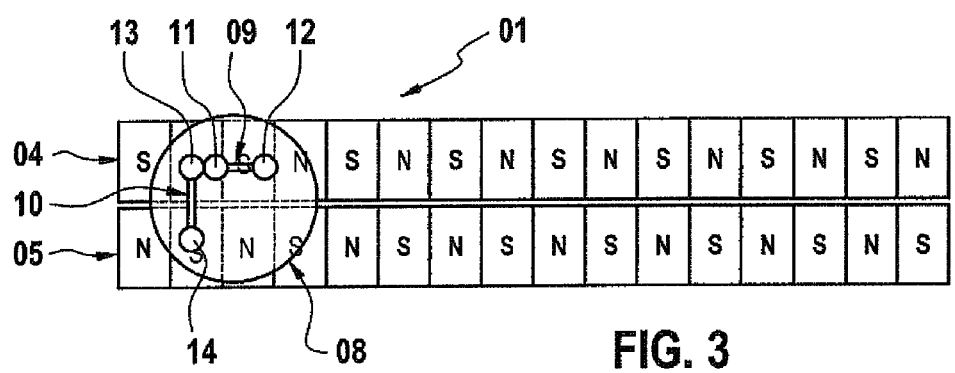
FIG. 3 shows the representation from FIG. 2 in a torque-loaded state.

A sensor system 01, whose configuration is illustrated in full or in part in FIG. 1 through FIG. 3, has two phase tracks 04, 05 which are situated circumferentially around rotating body 03 on two cross sections 06, 07 located a known distance apart in the axial direction along a rotation axis 02 of rotating body 03. Each of phase tracks 04, 05 includes a sequence of periodically alternatingly situated markings N, S, for example periodically alternating magnetic north and south poles.

Rotating body 03 has a known torsional stiffness, also known as torsional rigidity, which results from the product of the polar area moment of inertia of the geometry of rotating body 03 and the shear modulus of the material of rotating body 03.

Phase tracks 04, 05 may be situated, for example, on two sensor wheels representing the two cross sections 06, 07, the sensor wheels being connected to each other by a suitable shaft or torsion spring having a suitable torsional stiffness or torsional spring stiffness.

Sensor system 01 furthermore has a sensor 08, which includes sensor elements 11, 12, 13, 14 (FIGS. 2, 3 and 6) and 15, 16, 17 (FIG. 7), respectively, which are situated fixed in place opposite rotating body 03. Each sensor element 11, 12, 13, 14 and 15, 16, 17 is assigned to one phase track 04, 05, so that the particular phase track 04, 05 passes sensor element 11, 12, 13, 14 and 15, 16, 17, transversely to the rotation axis when body 03 rotates. Sensor elements 11, 12, 13, 14 and 15, 16, 17 are sensitive to markings N, S or to a change of markings N, S, so that each sensor element 11, 12, 13, 14 and 15, 16, 17 generates a sensor signal when it passes a marking, N, S, and/or at a change of adjacent markings N, S of particular phase track 04, 05 assigned to a sensor element 11, 12, 13, 14 and 15, 16, 17.

Sensor elements 11, 12, 13, 14 and 15, 16, 17 are connected to two sensor element bridges 09, 10, which may be situated at a right angle to each other, in sensor 08.

It is important to note that sensor element bridges 09, 10 of sensor system 01 may, in principle, be situated at any angle different from an integral multiple of 0° and 180° for the purpose of simultaneously detecting the rotational speed and torque. An angle of 90° formed between the two sensor element bridges 09, 10 is not absolutely necessary.

Figure 6:
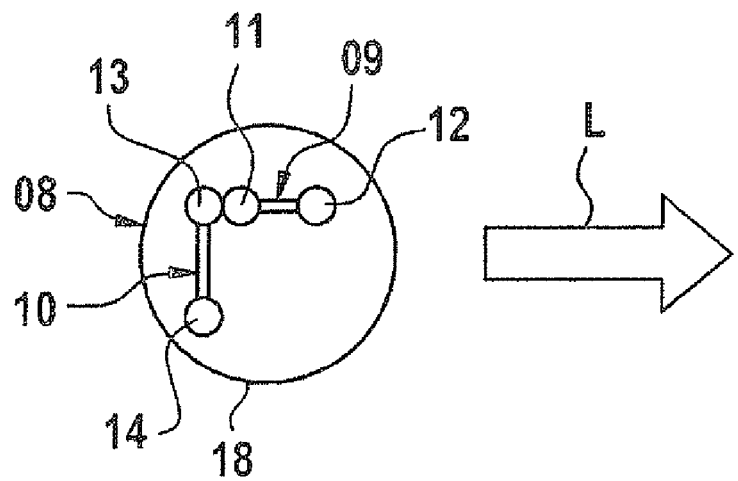
FIG. 6 shows a schematic representation of the configuration of a sensor, including the first and second sensor element bridges, according to a first exemplary embodiment.

In sensor 08 illustrated in FIGS. 2, 3 and 6, two sensor elements 11, 12 assigned to first phase track 04 are connected to form a first sensor element bridge 09, and a sensor element 13 assigned to first phase track 04 and a sensor element 14 assigned to second phase track 05 are connected to form a second sensor element bridge 10. First sensor element bridge 09 extends in a top view parallel to the two phase tracks 04, 05 (e.g., FIGS. 2 and 3), likewise parallel to direction of rotation L of phase tracks 04, 05 as well as perpendicularly to rotation axis 02 of rotating body 03. Second sensor element bridge 10 extends in a top view, for example, perpendicularly to the two phase tracks 04, 05 and parallel to rotation axis 02 of rotating body 03, so that it bridges the two phase tracks 04, 05 at a right angle. First sensor element bridge 09 is thus suitable for determining the rotational speed of rotating body 03, and second sensor element bridge 10 is suitable for determining a torque which is transmitted between the two cross sections 06, 07 via rotating body 03, as explained in greater detail below on the basis of FIGS. 2 through 5.

FIG. 2 shows a schematic representation of a torque-free state in which no torque is transmitted between cross sections 06, 07 of rotating body 03, and FIG. 3 shows a torque-loaded state in which a maximum torque is transmitted between cross sections 06, 07 of rotating body 03. FIGS. 4 and 5 show the curves of signals GR1, GR2 of the two sensor elements 13, 14 connected to second sensor bridge 10 over an imaginarily advancing observation period along the abscissa. The signals are proportionate to a magnetic field B of markings N, S, which are configured, for example, as magnetic north and south poles, which is why the ordinate is symbolically provided with symbol B for the magnetic field strength.

If no torque or approximately no torque is present between the two cross sections 06, 07 on rotating body 03, signals GR1 (FIG. 4a) and GR2 (FIG. 4b) of sensor elements 13, 14 of second sensor element bridge 10 are phase-synchronous, as shown in FIG. 4, since markings N, S of the two phase tracks 04, 05 also pass sensor elements 13, 14 of second sensor element bridge 10 at the same height in relation to each other. This changes as the torque increases, as shown in FIG. 5 for a maximum torque. At maximum torque, the two signals GR1 (FIG. 5a) and GR2 (FIG. 5b) are precisely phase-shifted, since markings N, S of the two phase tracks 04, 05 are now offset from each other as they pass sensor elements 13, 14 of second sensor element bridge 10.

Difference ΔB=GR2−GR1 of the two signals GR1 and GR2, which is illustrated under the curves of signals GR1 (FIGS. 4a and 4b) and GR2 (FIGS. 5a and 5b)) in FIG. 4c) and FIG. 5c), or the maximum amplitude of this difference, thus provides a measure for the mutual torsion of the two cross sections 06, 07 between each other. At a known torsional stiffness of rotating body 03, a known distance between the two cross sections 06, 07, and at a known shear modulus of the material from which rotating body 03 is manufactured, the torque transmitted between the two cross sections 06, 07 of rotating body 03 may be directly inferred on the basis of difference ΔB between the two signals GR1 and GR2.

Figure 7:
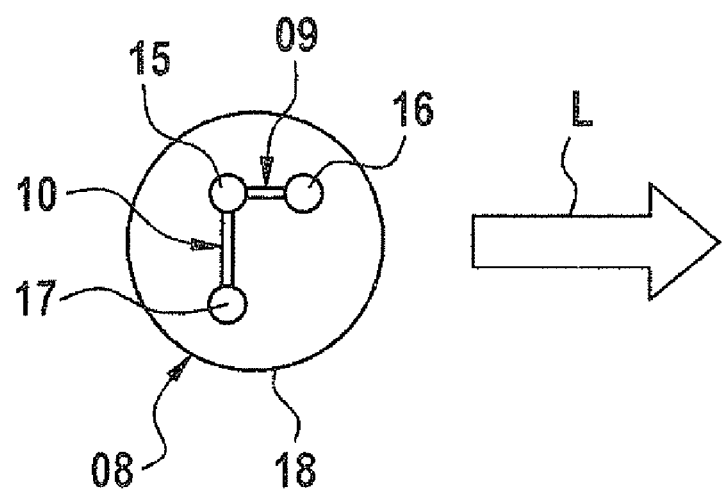
FIG. 7 shows a schematic representation of the configuration of a sensor, including the first and second sensor element bridges, according to a second exemplary embodiment.

FIGS. 6 and 7 show two alternative embodiments of the configuration of the two sensor element bridges 09, 10 of a sensor 08, for example on a shared chip 18.

The variant illustrated in FIG. 6 provides for constructing each of the two sensor element bridges 09, 10 with the aid of separate sensor elements 11, 12 and 13, 14, respectively, which are provided, for example, on chip 18. A first sensor element 11 assigned to first phase track 04, together with a second sensor element 12 which is also assigned to first phase track 04, is connected to first sensor element bridge 09, which is provided for determining the rotational speed and which may run approximately parallel to direction of rotation L of first phase track 04 or of the two phase tracks 04, 05. Together with a sensor element 13 assigned to first phase track 04, a sensor element 14 assigned to second phase track 05 is connected to second sensor element bridge 10, which extends perpendicularly to direction of rotation L of the two phase tracks 04, 05 and which bridges the two phase tracks 04, 05 and which is provided for determining the torque.

In contrast, the variant illustrated in FIG. 7 makes do with only three sensor elements 15, 16, 17, which are situated, for example, on a shared chip 18. In this case, it is provided that a first sensor element 15 assigned to first phase track 04, together with a second sensor element 16 which is also assigned to first phase track 04, is also connected to first sensor element bridge 09, which is provided for determining the rotational speed and which runs parallel to direction of rotation L of first phase track 04 or of the two phase tracks 04, 05. Unlike in FIG. 6, however, it is provided in this case to connect a sensor element 17 assigned to second phase track 05, together with first sensor element 15 assigned to first phase track 04 and connected, together with sensor element 16, to first sensor element bridge 09, to second sensor element bridge 10, so that first sensor element 15 is both part of first sensor element bridge 09 and second sensor element bridge 10, which may be oriented at a right angle thereto.

In all embodiment variants of sensor 08 illustrated in FIGS. 2, 3 and 6, 7, sensor elements 11, 12, 13, 14, and 15, 16, 17 of the two sensor element bridges 09, 10 may be situated in a shared housing, for example in the form of a separate ASIC housing (ASIC; Application Specific Integrated Circuit) and/ or on a shared chip 18 and/or within a shared sensor housing.

It is important to note that the two cross sections 06, 07 may also be represented by sensor wheels which are situated at a distance from each other, for example on a shaft. In this case, the shaft forms rotating body 03 having a known torsional stiffness. Direction of rotation L of phase tracks 04, 05 then corresponds to the direction of rotation of the sensor wheels.

Hall elements may be used as sensor elements, markings N, S of the two phase tracks 04, 05 then being configured as periodically alternatingly situated magnetic north and south poles, as described above. It is also conceivable to use magnetoresistive elements, for example GMR elements.

What is claimed is:

1. A sensor system, comprising:
a first phase track;
a second phase track spaced a distance apart from the first phase track in an axial direction of a rotation axis of a rotating body;
a first pair of sensor elements that at least one of is assigned to and detects the first phase track and is situated fixed in place opposite the rotating body, the first pair including a first sensor element and a second sensor element;
a third sensor element that at least one of is assigned to and detects the second phase track and is situated fixed in place opposite the rotating body;
a first sensor element bridge that connects the first pair of sensor elements;
a second sensor element bridge that connects one of the first pair of sensor elements and the third sensor element;
wherein:
the first phase track and the second phase track are situated circumferentially around the rotating body;
the first sensor element bridge is situated parallel to the first phase track and perpendicular to the rotation axis of the rotating body in a top view; and
the second sensor element bridge extends transversely to the first and second phase tracks in a top view.

2. The sensor system of claim 1, wherein:
the first pair of sensor elements detects the first phase track;
the third sensor element is part of a second pair of sensor elements that detects the second phase track; and
the first sensor element bridge is situated parallel also to the second phase track.

3. The sensor system of claim 2, further comprising:
a third pair of sensor elements that detects the first phase track and is situated fixed in place opposite the rotating body; and
a third sensor element bridge that connects the third pair of sensor elements;
wherein the third sensor element bridge is situated parallel to the first sensor element bridge.

4. The sensor system of claim 1, further comprising:
a third sensor element bridge which is situated parallel to the first sensor element bridge and which is assigned to the first phase track.

5. The sensor system of claim 4, wherein the second sensor element bridge, together with the first sensor element bridge, forms in a top view an approximately right angle, and the second sensor element bridge extends in a top view largely perpendicularly to the two phase tracks and parallel to the rotation axis.

6. The sensor system of claim 4, wherein the first sensor element bridge and the second sensor element bridge are situated in a shared housing.

7. The sensor system of claim 4, wherein the first sensor element bridge and the second sensor element bridge are situated on a shared chip.

8. The sensor system of claim 4, wherein at least the first phase track and the second phase track are situated on two separate sensor wheels which are connected to the rotating body.

9. The sensor system of claim 4, wherein at least the sensor elements of at least one of the sensor element bridges are Hall elements, the particular associated phase track including magnetic markings.

10. The sensor system of claim 4, wherein at least the sensor elements of at least one of the sensor bridges are magnetoresistive elements.

11. The sensor system of claim 4, wherein at least the sensor elements of at least one of the sensor bridges are giant magnetoresistive (GMR) elements.

12. The sensor system of claim 4, wherein:
the first sensor element bridge detects a rotational speed of the rotating body; and
the second sensor element bridge ascertains a torque transmitted between two cross sections of the rotating body.

13. The sensor system of claim 12, wherein the torque is ascertained based on a torsional stiffness of the rotating body, a distance between the two cross sections, a shear modulus of the rotating body, a torsion angle between the two cross sections, and a difference in magnetic fields associated with the sensor elements connected to the second sensor element bridge.

14. The sensor system of claim 4, wherein the sensor system transmits and receives rotational and torque data over a single signal line.

15. A method for determining rotational speed and torque of a rotating body using a single line and two sensor bridges connecting no more than three sensors, the method comprising:
determining the rotational speed from a first of the two sensor bridges;
determining a torsion angle between two cross sections of the rotating body;
determining a difference in magnetic fields associated with the sensor elements connected by the second sensor bridge by observing a phase shift between signals generated by the sensor elements connected by the second sensor bridge; and
determining the torque based on a distance between the two cross sections, the difference in magnetic fields, and a torsional stiffness of the rotating body.

16. The method of claim 15, wherein the first and second sensor element bridges are arranged parallel to each other, and the method further comprises determining a direction of rotation using the first and second sensor element bridges.

* * * * *